US008838756B2

(12) United States Patent
Dalal et al.

(10) Patent No.: US 8,838,756 B2
(45) Date of Patent: Sep. 16, 2014

(54) MANAGEMENT AND IMPLEMENTATION OF ENCLOSED LOCAL NETWORKS IN A VIRTUAL LAB

(75) Inventors: Anupam Dalal, Emerald Hills, CA (US); Min-Ken Lai, Redwood City, CA (US); Aastha Bhardwaj, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 958 days.

(21) Appl. No.: 12/510,135

(22) Filed: Jul. 27, 2009

(65) Prior Publication Data
US 2011/0022695 A1 Jan. 27, 2011

(51) Int. Cl.
*G06F 15/177* (2006.01)
*G06F 15/16* (2006.01)

(52) U.S. Cl.
USPC ............ 709/222; 709/203; 709/218; 709/224

(58) Field of Classification Search
USPC ......................................... 709/222
See application file for complete search history.

(56) References Cited

U.S. PATENT DOCUMENTS

| 6,151,324 | A | 11/2000 | Belser et al. |
| 7,203,944 | B1 * | 4/2007 | van Rietschote et al. ...... 718/104 |
| 7,263,700 | B1 * | 8/2007 | Bacon et al. ........................ 718/1 |
| 7,467,198 | B2 * | 12/2008 | Goodman et al. ............. 709/223 |
| 7,640,298 | B2 | 12/2009 | Berg |
| 7,716,667 | B2 * | 5/2010 | van Rietschote et al. .......... 718/1 |
| 7,725,559 | B2 * | 5/2010 | Landis et al. .................. 709/215 |
| 7,752,635 | B2 * | 7/2010 | Lewites ......................... 719/327 |
| 7,761,259 | B1 | 7/2010 | Seymour |
| 7,797,507 | B2 | 9/2010 | Tago |
| 7,814,541 | B1 | 10/2010 | Manvi |
| 7,865,893 | B1 * | 1/2011 | Omelyanchuk et al. .......... 718/1 |
| 7,865,908 | B2 * | 1/2011 | Garg et al. ..................... 719/321 |
| 7,941,812 | B2 * | 5/2011 | Sekar ............................ 719/319 |
| 7,958,506 | B2 * | 6/2011 | Mann ................................ 718/1 |
| 7,983,257 | B2 * | 7/2011 | Chavan et al. ................ 370/389 |
| 7,984,108 | B2 * | 7/2011 | Landis et al. ................. 709/215 |
| 7,987,432 | B1 | 7/2011 | Grechishkin |
| 8,019,837 | B2 * | 9/2011 | Kannan et al. ................ 709/220 |
| 8,036,127 | B2 * | 10/2011 | Droux et al. .................. 370/236 |
| 8,051,180 | B2 | 11/2011 | Mazzaferri |
| 8,054,832 | B1 | 11/2011 | Shukla |
| 8,065,714 | B2 | 11/2011 | Budko |

(Continued)

FOREIGN PATENT DOCUMENTS

| JP | 2004145684 A | 5/2004 |
| WO | 3058584 A4 | 7/2003 |
| WO | 2008098147 A1 | 8/2008 |

*Primary Examiner* — Melvin H Pollack

(57) ABSTRACT

Methods, systems, and computer programs for creating isolated environments that include virtual machines (VM) and networks in a virtual infrastructure are presented. The method includes an operation to define a configuration of a virtual system which includes VMs, virtual network interface cards (VNIC) in the VMs, and configuration local networks (CLN). Further, the method associates each VNIC with one of the CLNs and transmits instructions to the virtual infrastructure for deploying the configuration. Deploying the configuration includes instantiating VMs and CLNs in the virtual infrastructure. Each VM is instantiated in a host monitored by a virtual lab server, and the CLNs are instantiated in the same hosts where the VMs have been instantiated. Only VMs from the configuration can connect to the instantiated CLNs. The method further transmits instructions to the virtual infrastructure to customize the VMs by executing the customization instructions in the guest operating systems of the VMs to configure the VMs' VNICs.

24 Claims, 17 Drawing Sheets

(56) References Cited

U.S. PATENT DOCUMENTS

| | | |
|---|---|---|
| 8,068,602 B1 | 11/2011 | Bluman |
| 2005/0182853 A1* | 8/2005 | Lewites et al. .............. 709/238 |
| 2007/0234302 A1 | 10/2007 | Suzuki et al. |
| 2008/0028401 A1* | 1/2008 | Geisinger ...................... 718/1 |
| 2008/0043756 A1* | 2/2008 | Droux et al. ................. 370/399 |
| 2008/0163207 A1* | 7/2008 | Reumann et al. .............. 718/1 |
| 2008/0209415 A1* | 8/2008 | Van Riel et al. ............... 718/1 |
| 2008/0215705 A1 | 9/2008 | Liu et al. |
| 2008/0244579 A1 | 10/2008 | Muller |
| 2009/0254990 A1* | 10/2009 | McGee ........................... 726/22 |
| 2010/0107162 A1* | 4/2010 | Edwards et al. ................ 718/1 |
| 2010/0138830 A1 | 6/2010 | Astete |
| 2010/0169880 A1* | 7/2010 | Haviv et al. ..................... 718/1 |
| 2010/0180275 A1* | 7/2010 | Neogi et al. .................... 718/1 |
| 2010/0191881 A1* | 7/2010 | Tauter et al. .................. 710/104 |
| 2010/0235831 A1* | 9/2010 | Dittmer ........................... 718/1 |
| 2010/0257263 A1 | 10/2010 | Casado et al. |
| 2010/0275199 A1* | 10/2010 | Smith et al. .................... 718/1 |
| 2010/0281478 A1 | 11/2010 | Sauls et al. |
| 2010/0306773 A1* | 12/2010 | Lee et al. ........................ 718/1 |
| 2010/0333189 A1* | 12/2010 | Droux et al. .................... 726/13 |
| 2011/0023031 A1* | 1/2011 | Bonola et al. ................... 718/1 |
| 2011/0035494 A1* | 2/2011 | Pandey et al. ................ 709/224 |
| 2011/0075664 A1 | 3/2011 | Lambeth |

* cited by examiner

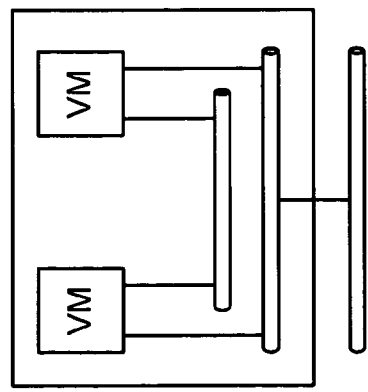
Fig. 4A Cluster Heartbeat
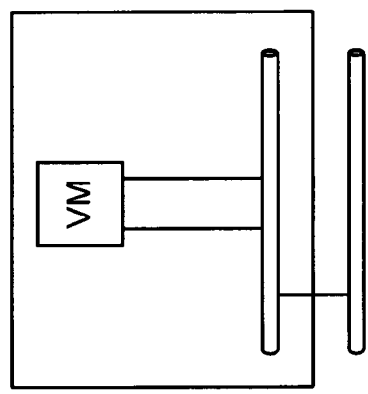
Fig. 4B Failover NIC
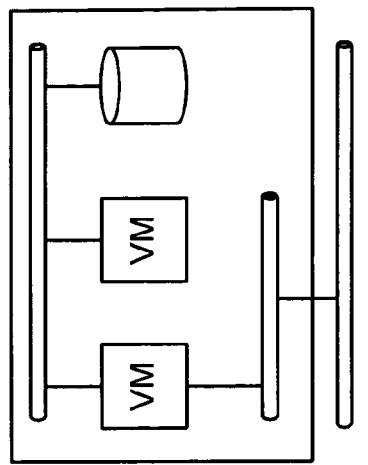
Fig. 4C Backup over a backup network
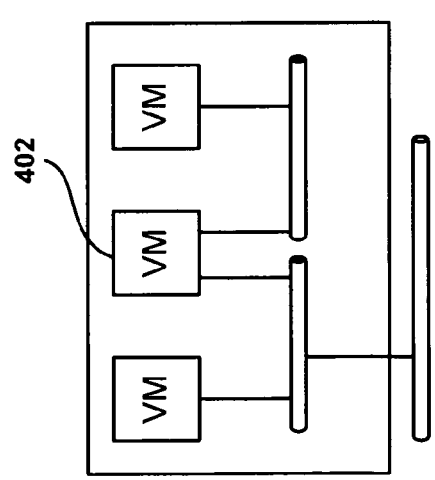
Fig. 4D Firewall Testing
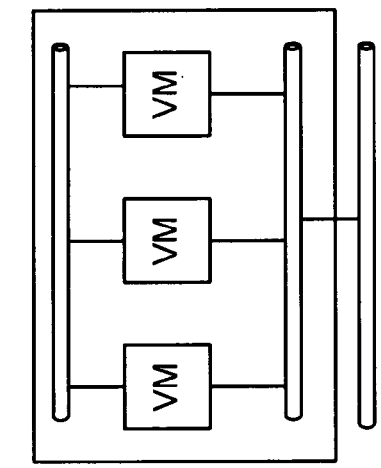
Fig. 4E Load Balancing

Physical Network Bindings

| Host | Virtual Switch (Network Adapters): Observed IP ranges |
|---|---|
| 10.6.2.28 | vSwitch0 (vmnic0): 10.6.0.1-10.6.127.254 ▶ |
| 10.6.2.27 | vSwitch0 (vmnic0): 10.6.0.1-10.6.127.254 |
| 10.6.2.26 | vSwitch0 (vmnic0): 10.6.0.1-10.6.127.254 |
| 10.6.2.34 | - no binding - |
| 10.6.2.37 | - no binding - |
| 10.6.2.35 | - no binding - vSwitch0 (vmnic0): 10.6.0.1-10.6.127.254 vSwitch1 (vmnic1): 10.20.6.1-10.20.6.254 |

Fig. 12

MANAGEMENT AND IMPLEMENTATION OF ENCLOSED LOCAL NETWORKS IN A VIRTUAL LAB

CROSS REFERENCE TO RELATED APPLICATIONS

This application is related to U.S. patent application Ser. No. 12/510,072 filed on Jul. 27, 2009 and entitled "AUTOMATED NETWORK CONFIGURATION OF VIRTUAL MACHINES IN A VIRTUAL LAB ENVIRONMENT", which is incorporated herein by reference.

DESCRIPTION OF THE RELATED ART

Virtualization of computer resources generally involves abstracting computer hardware, which essentially isolates operating systems and applications from underlying hardware. Hardware is therefore shared among multiple operating systems and applications wherein each operating system and its corresponding applications are isolated in corresponding virtual machines (VM) and wherein each VM is a complete execution environment. As a result, hardware can be more efficiently utilized.

Virtual labs, such as VMware's vCenter Lab Manager™ from the assignee of the present patent application, enable application development and test teams to create and deploy complex multi-tier system and network configurations on demand quickly. Testing engineers can set up, capture, and reset virtual machine configurations for demonstration environments in seconds. In addition, hands-on labs can be quickly configured and deployed, to be used for lab testing, hands-on training classes, etc.

The creation of virtual lab environments requires flexible tools to assist in the creation and management of computer networks. For example, if a test engineer decides to perform different tests simultaneously on one sample environment, the test engineer must deploy multiple times the sample environment. The multiple deployments must coexist in the virtual infrastructure. However, these environments often have network configurations, that when deployed multiple times, would cause networking routing problems, such as the creation of VMs with duplicate Internet Protocol (IP) addresses, an impermissible network scenario for the proper operation of the VMs and of the virtual lab environments.

SUMMARY

In one embodiment, a method includes an operation to define a configuration of a virtual system, which includes VMs, virtual network interface cards (VNIC) in the VMs, and Configuration Local Networks (CLN). Further, the method associates each VNIC with one of the CLNs and transmits instructions to the virtual infrastructure for deploying the configuration. Deploying the configuration includes instantiating VMs and CLNs in the virtual infrastructure. Each VM is instantiated in a host monitored by a virtual lab server, and the CLNs are instantiated in the same hosts where the VMs have been instantiated. Only VMs from the configuration can connect to the instantiated CLNs. The method further transmits customization instructions to the virtual infrastructure to customize the VMs by executing the customization instructions in the guest operating systems of the VMs to configure the VM VNICs.

In another embodiment, a computer program embedded in a computer-readable storage medium, when executed by one or more processors, performs the method operations. In yet another embodiment, a system for creating isolated environments that include VMs and networks in a virtual infrastructure is presented. The system includes a database and an application module. The database stores configurations of virtual systems and the virtual lab networks created. Each configuration includes VMs, virtual lab networks, VNICs in the VMs, and connections from the VMs to the virtual lab networks. The application module transmits instructions to the virtual infrastructure to deploy the configuration. The deployment includes operations of instantiating the VMs of the configuration in the virtual infrastructure and instantiating the virtual lab networks in the hosts where the VMs have been instantiated. Additionally, the VMs are instantiated in a host monitored by a virtual lab server. The deployment also includes an operation to perform customization instructions at each VM, where the customization instructions are executed by a Guest Operating System (GOS) in the VMs to configure the VNICs in the VMs.

BRIEF DESCRIPTION OF THE DRAWINGS

FIGS. 4A-E illustrate the different uses of configurations with multi-networked VMs in accordance with one or more embodiments.

FIG. 12 shows an embodiment of a user interface for configuring virtual lab shared networks.

DETAILED DESCRIPTION

The following embodiments describe methods, systems, and computer programs for creating isolated environments that include virtual machines (VM) and networks in a virtual infrastructure. The method includes an operation to define a configuration of a virtual system with VMs, virtual network interface cards (VNIC) in the VMs, and configuration local networks (CLN). Further, the method associates each VNIC with one of the CLNs and transmits instructions to the virtual infrastructure for deploying the configuration. Deploying the configuration includes instantiating VMs and CLNs in the virtual infrastructure. Each VM is instantiated in a host monitored by a virtual lab server, and the CLNs are instantiated in the same hosts where the VMs have been instantiated. Only VMs from the configuration can connect to the instantiated CLNs. The method further transmits instructions to the virtual infrastructure to customize the VMs by executing the customization instructions in the guest operating systems of the VMs to configure the VM VNICs.

Embodiments of the invention provide the ability to build and reuse network topologies in a virtual laboratory environment. Virtual lab creates and manages shared and private virtual lab networks, creates layer 3 network overlays, connects VMs to networks, configures single and multi-homed VMs, manages the reservation of Media Access Control (MAC) and Internet Protocol (IP) addresses, detects conflicts, etc. It will be obvious, however, to one skilled in the art, that the present invention may be practiced without some or all of these specific details. In other instances, well known process operations have not been described in detail in order not to unnecessarily obscure the present invention.

Figure 1:
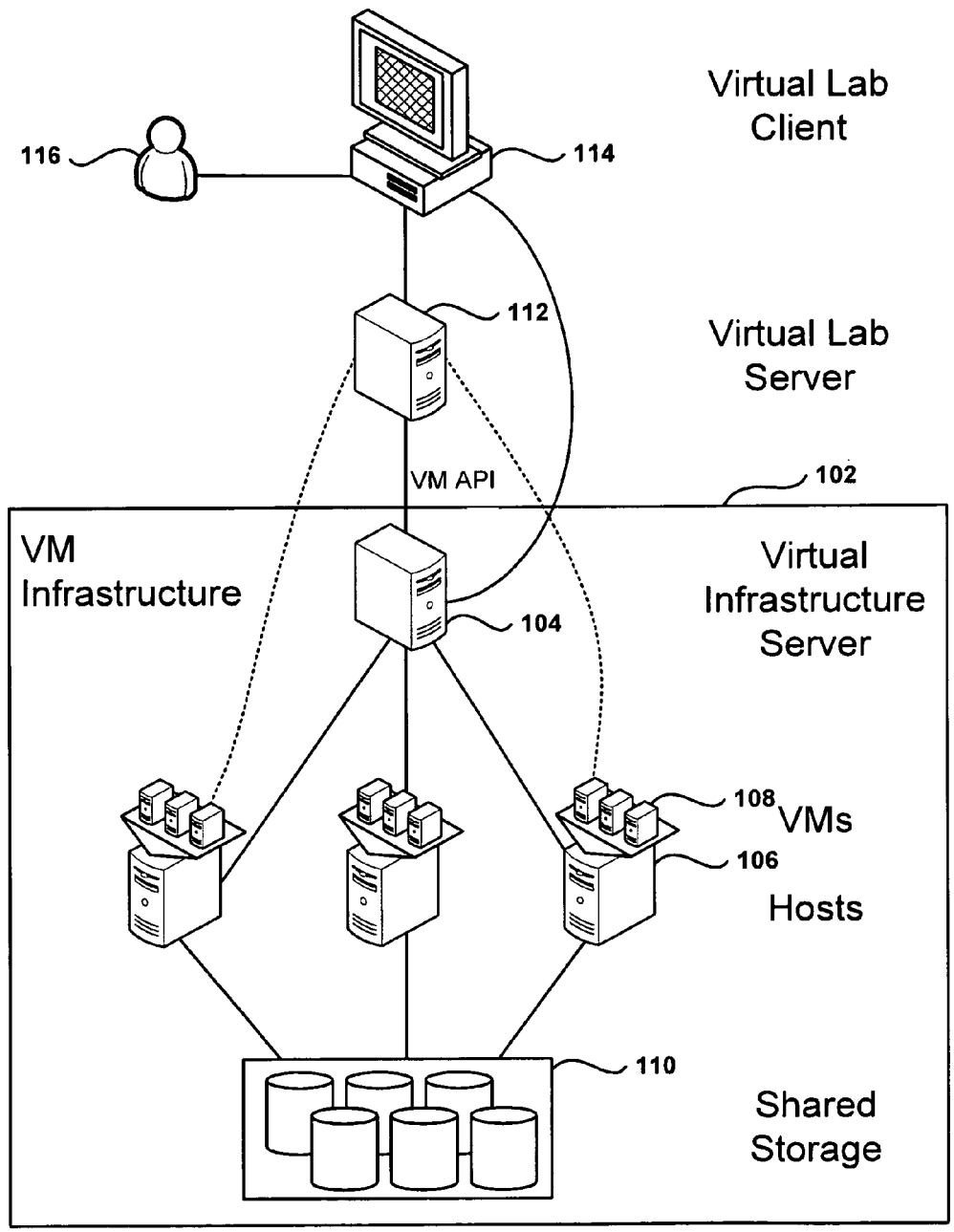
FIG. 1 includes an architectural diagram of an embodiment of a virtual infrastructure system.

FIG. 1 includes an architectural diagram of an embodiment of a virtual infrastructure system. Virtual infrastructure 102 includes one or more virtual infrastructure servers 104 that manage a plurality of hosts 106. Virtual machines 108 are instantiated in hosts 106, and the multiple hosts share a plurality of resources within the virtual infrastructure, such as shared storage 110. A configuration is a core element of a virtual lab and is composed of virtual machines and virtual lab networks. Virtual lab users can group, deploy, save, share, and monitor multi-machine configurations. Configurations reside in the library or in user workspaces, in which case they are referred to as workspace configurations.

Virtual lab networks, also referred to herein as enclosed local networks, can be categorized as private networks and shared networks. Private networks in a configuration are those networks available exclusively to VMs in the configuration, that is, only VMs in the configuration can have a Network Interface Controller (NIC) or VNIC connected directly to a switch or virtual switch (VSwitch) for the private network. Access to data on a private network is restricted to members of the configuration, that is, the private network is isolated from other entities outside the configuration. This is done by providing layer 2 isolation in the virtual switch of the virtual infrastructure. In one embodiment, a private network in the configuration can be connected to a physical network to provide external connectivity to the VMs in the private network, as discussed in more detail below. Private networks in a configuration are also referred to herein as configuration local networks or virtual networks. Shared networks, also referred to herein as shared physical networks or physical networks, are available to all VMs in the virtual infrastructure, which means that a configuration including a shared network will enable VMs in the shared network to communicate with other VMs in the virtual infrastructure connected, directly or indirectly, to the shared network. In one embodiment, a shared network is part of a Virtual Local Area Network (VLAN).

Deploying a configuration causes the VMs and networks in the configuration to be instantiated in the virtual infrastructure. Instantiating the VMs includes registering the VMs in the virtual infrastructure and powering-on the VMs. When an individual VM from a configuration is deployed, virtual lab deploys all shared networks and CLNs associated with the configuration using the network connectivity options in the configuration. If a network in the configuration already exists in the virtual infrastructure, the deployment will use the existing network. If the network does not exist, the deployment will request from the virtual infrastructure the instantiation of the network. In one embodiment, not all the VMs are instantiated because the user selects which VMs to be instantiated in the virtual infrastructure. Undeploying a configuration de-instantiates the VMs in the configuration from the virtual infrastructure. De-instantiating VMs includes powering off or suspending the VMs and un-registering the VMs from the virtual infrastructure. The state of the deployment can be saved in storage or discarded. Saving the memory state helps debugging memory-specific issues and makes VMs in the configuration ready for deployment and use almost instantly.

Virtual lab server 112 manages and deploys virtual machine configurations in a collection of hosts 106. It should be appreciated that not all hosts 106 need to be part of the scope of virtual lab server 112, although in one embodiment, all the hosts are within the scope of virtual lab server 112. Virtual lab server 112 manages hosts 106 by communicating with virtual infrastructure server 104, and by using virtual lab server agents installed on those hosts. In one embodiment, virtual lab server 112 communicates with virtual infrastructure server 104 via an Application Programming Interface (API), for example, to request the instantiation of VMs and networks.

Although virtual lab server 112 is used to perform some management tasks on hosts 106, the continuous presence of virtual lab server 112 is not required for the normal operation of deployed VMs, which can continue to run even if virtual lab server 112 becomes unreachable, for example because a network failure. One or more users 116 interface with virtual lab server 112 and virtual infrastructure 102 via a computer interface, which in one embodiment is performed via web browser.

Figure 2A:
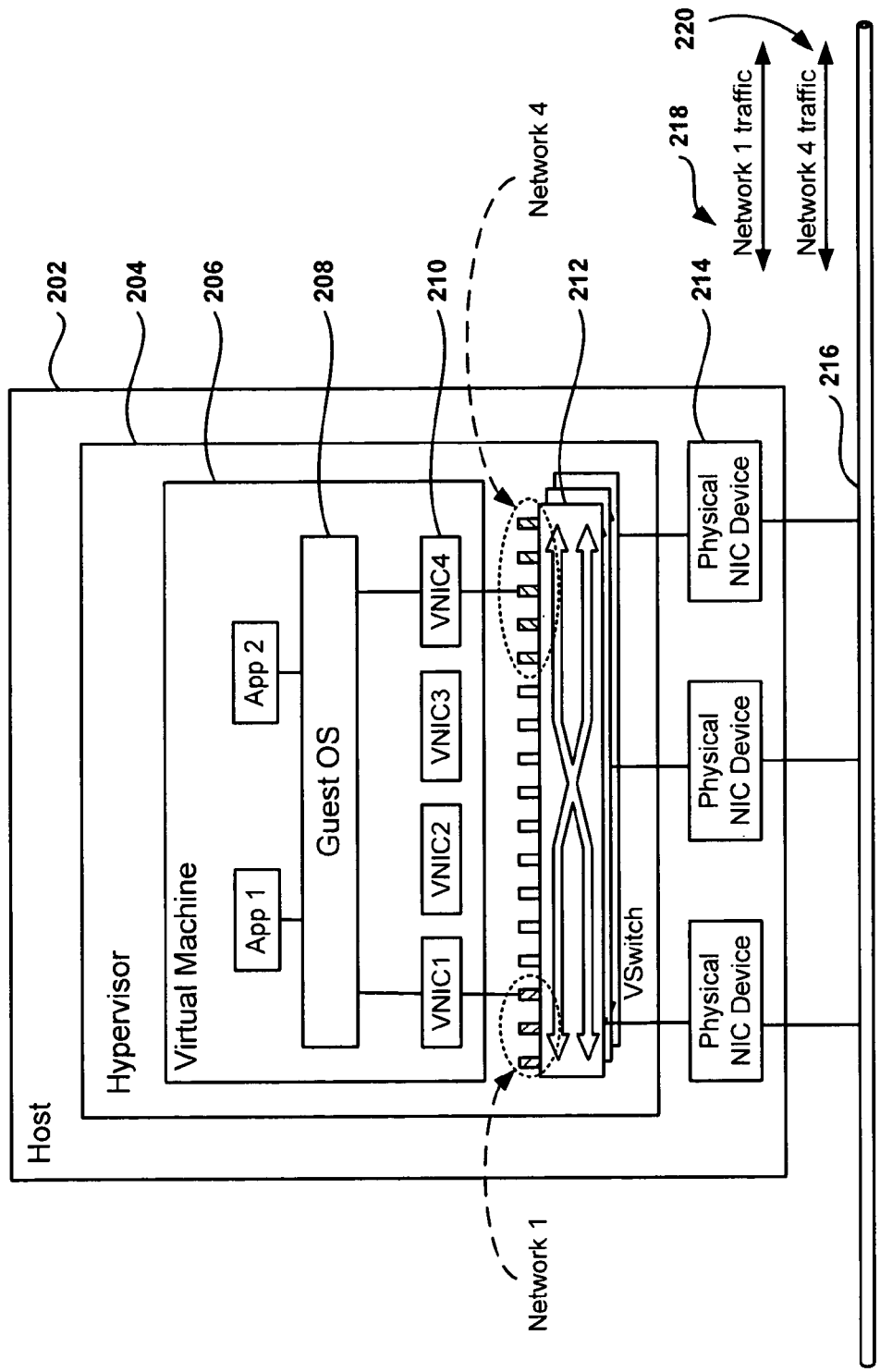
FIG. 2A depicts one embodiment of the host architecture for instantiating Virtual Machines (VM) with multiple Virtual Network Interface Cards (VNIC).

FIG. 2A depicts one embodiment of the host 202 architecture for instantiating VMs 206 with multiple VNICs 210. Hypervisor 204, also referred to as virtual infrastructure layer, manages the assignment of VMs 206 in host 202 to remote users. VM 206 includes Guest Operating System (GOS) 208 and multiple VNICs 210. Each VNIC 210 is connected to a VSwitch 212 that provides network switch functionality for each of the network interfaces. VSwitches 212 are connected to a physical NIC device in the host to connect to network 216. Each of the VNICs and VSwitches are independent, thus a VM can connect to several networks via several VNICs that connect to one or more physical NIC devices 214. In another embodiment, each VSwitch 212 is connected to a different physical NIC device, thus each VSwitch 212 provides connectivity for networks implemented on the corresponding network attached to the physical NIC device. For example, in the embodiment illustrated in FIG. 2A, physical network 216 carries traffic for two different networks, Network 1 218 and Network 4 220. Network 1 218 and Network 4 220 are two network overlays operating on the same physical network 216. VSwitch 212 assigns a set of ports to Network 1 and a different set of ports to Network 4, where each set of ports supports MAC addressing for the corresponding network. Thus, packets with IP addresses from Network 1 coexist with packets with IP addresses from Network 4 on the same transmission media.

The network overlays are configured to have separate Layer 2 (Ethernet) & Layer 3 (Internet Protocol) addressing from the underlying physical infrastructure, allowing a physical network or a CLN to have different subnet masks, gateways, and IP address pools from the underlying physical network. Further, the CLNs may be connected to a virtual router that performs address translation in order to provide connectivity to the underlying physical network infrastructure via a gateway or default router, as discussed in more detail below in reference to FIG. 3.

Figure 2B:
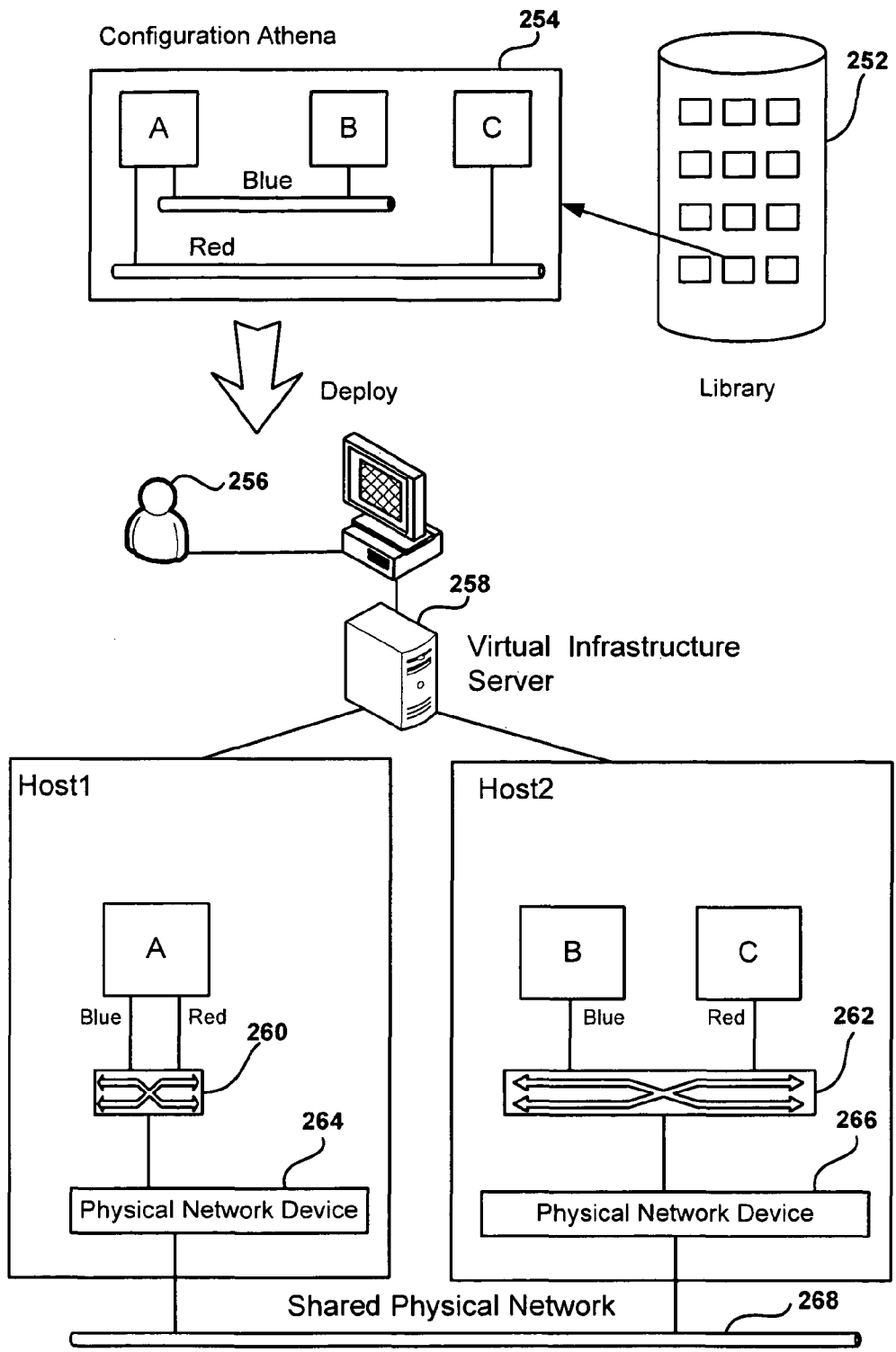
FIG. 2B illustrates an embodiment of the process to deploy a virtual lab configuration in the virtual infrastructure.

FIG. 2B illustrates an embodiment of the process to deploy virtual lab configuration 254 named Athena in the virtual infrastructure. User 256 interfaces with virtual lab and requests the deployment of configuration 254 Athena residing in Library 252. As a result, virtual infrastructure server 258 deploys the elements of configuration 254 in the virtual infrastructure. More specifically, VM A is instantiated in Host1, VMs B and C are instantiated in Host 2, and the Blue and Red networks are implemented in VSwitches 260 and 266. As previously discussed in reference to FIG. 1, instantiating a VM includes registering the VM in the virtual infrastructure and powering-on the VM. Shared Physical Network 268 interconnects Host1 and Host2.

It should be appreciated that the embodiment illustrated in FIG. 2B is an exemplary deployment of configuration 254. Other deployments may result in different results, such as instantiating VMs A, B, and C in the same host, or instantiating the three VMs in three different hosts. The embodiment illustrated in FIG. 2B should therefore not be interpreted to be exclusive or limiting, but rather exemplary or illustrative.

Figure 2C:
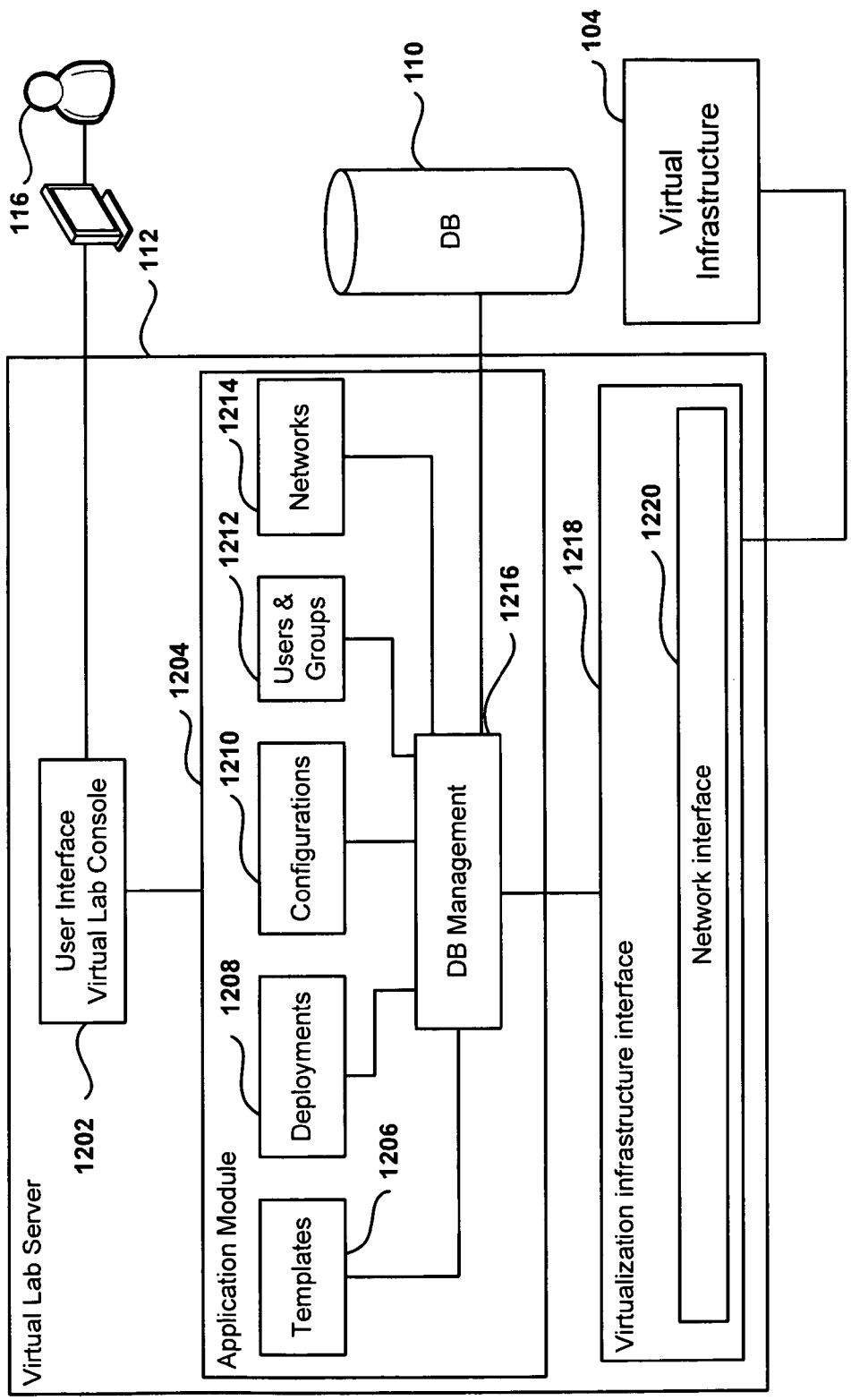
FIG. 2C illustrates the architecture of the virtual lab server in accordance with one embodiment.

FIG. 2C illustrates the architecture of virtual lab server 112 in accordance with one embodiment. User interface module 1202 provides a virtual lab console for user 116 to perform different virtual lab operations, such as creating, copying, and cloning configurations, creating VMs, creating network templates, deploying, un-deploying and re-deploying configurations, sharing configurations and templates, creating terminal consoles for the VMs, etc. A network template contains the specification of a virtual lab network. One or more VNICs can be associated with a network template, and when the VM is deployed, virtual lab creates a virtual lab network based on the network template and connects the VNIC to that network. Network templates allow administrators and template creators to predefine the virtual networks available for other users. A network template provides control and consistency across the virtual lab installation and within an organization. Network templates can be shared with other users in an organization or across the entire virtual lab installation. A virtual machine template is a VM image loaded with an operating system, applications, and data. After a VM template is defined, users can quickly and easily create multiple VMs based on the VM template without having to reinstall software or redo setup tasks on each VM. Using VM templates ensures that VMs are consistently configured across an entire organization.

Application module 1204 executes the core functionality of virtual lab server 112. Database manager 1216 interfaces with database 110, residing in the virtual infrastructure shared storage, to store and retrieve the information used by virtual lab server 112. This information includes templates 1206 (VMs and networks), virtual lab deployments 1208, virtual lab configurations 1210, virtual lab users and groups 1212, and virtual lab networks 1214. More details on the different elements in the database are described below in reference to FIG. 7. Virtualization infrastructure interface 1218 in virtual lab server 112 sends and receives information to and from virtual infrastructure 104, such as for example to request that VMs be instantiated in the virtual infrastructure.

It should be appreciated that the embodiments illustrated in FIG. 2C are exemplary virtual lab modules, and other modules have been omitted for simplicity of description. Other embodiments may utilize different modules or configurations of modules. For example, in one embodiment the data structures are stored in a database not part of the virtual infrastructure pool of resources. The embodiments illustrated in FIG. 2C should therefore not be interpreted to be exclusive or limiting, but rather exemplary or illustrative.

Figure 3:
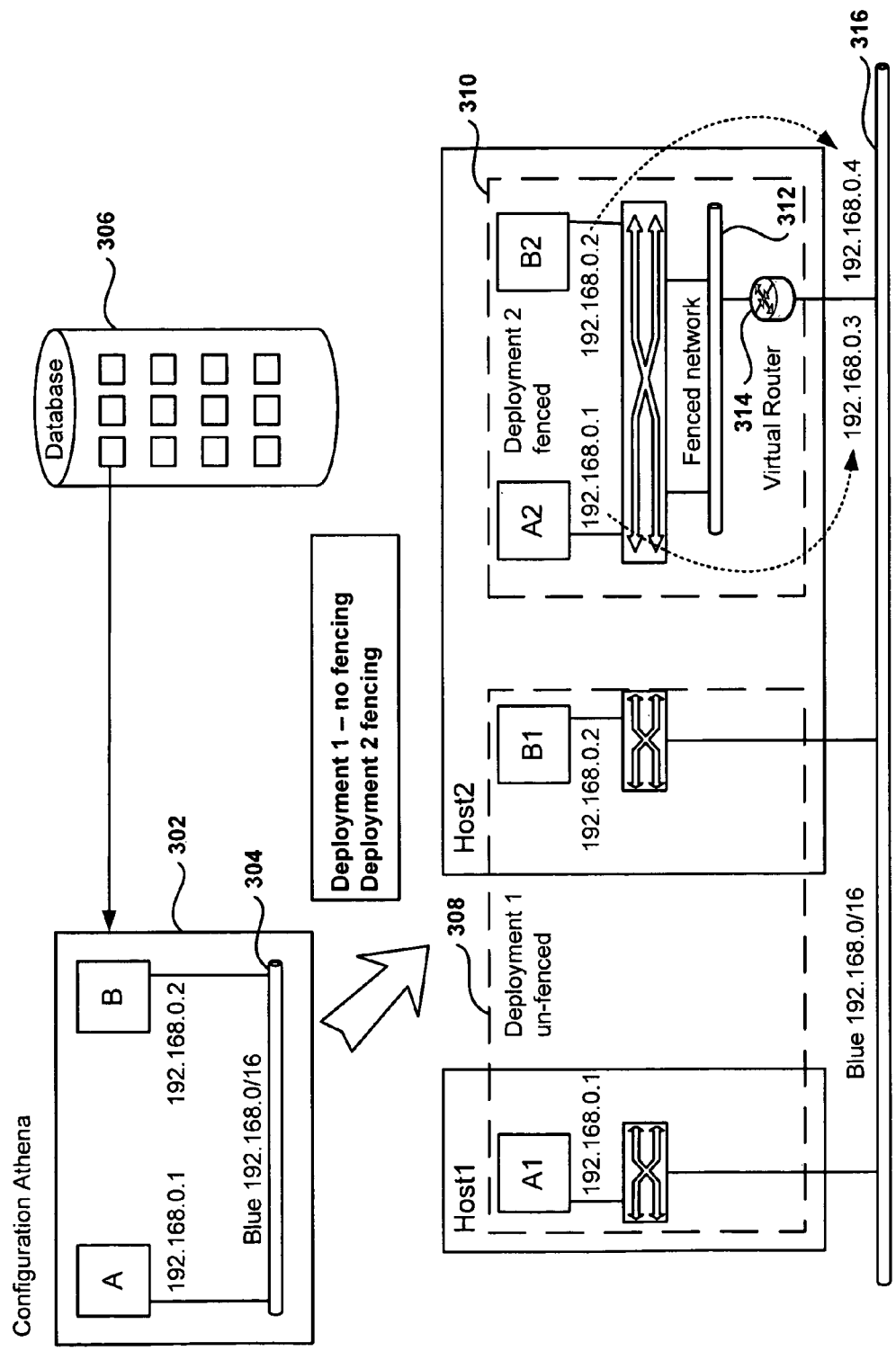
FIG. 3 illustrates the deployment of fenced networks according to one embodiment.

FIG. 3 illustrates the deployment of fenced networks according to one embodiment. Virtual lab implements network fencing, an architecture that isolates or "fences" VM configurations while giving the VMs full network access. Fencing enables multiple deployments of the same configuration on the same physical network. For example, when concurrent development or testing on the same configuration is desired, the user can duplicate or clone the configuration. When a cloned configuration is created, virtual lab assigns the same network parameters to the cloned VMs and the VMs retain the same network configuration. If the original and cloned configurations are deployed at the same time, duplicate address errors can be avoided by deploying one of the configurations in fenced mode.

When VMs in a configuration have preconfigured IP addresses and the VMs are deployed in fenced mode, virtual lab assigns a unique external IP address to each of these VMs. Through these external addresses, VMs inside the fence and VMs outside the fence can communicate with each other. Virtual lab uses a VM called a virtual router to route packets between these VMs. The virtual router has at least two virtual NICs and "routes" traffic between the networks connected to the virtual NICs. In one embodiment, virtual lab configures the virtual router when a fenced configuration is deployed and deletes the virtual router when the configuration is undeployed.

Referring now to the fenced deployments shown in FIG. 3, configuration 302 named Athena has been cloned and deployed. Additionally, the cloned configuration has also been deployed, resulting in two deployments of configurations with the same elements. Configuration 302 includes VMs A and B, and network Blue 304 with subnet 192.168.0/16. VMs A and B have IP addresses of 192.168.0.1 and 192.168.0.2, respectively. The first deployment Deployment 1 308 has been deployed un-fenced, and the second deployment Deployment 2 310 has been deployed in fenced mode. Because Deployment 1 308 is unfenced, the resulting VMs A1 and A2 connect directly to shared network 192.168.0/16. It should be noted that to deploy configuration 302 in unfenced mode, a shared network with the same network specification must exist so the VMs in the configuration can use the network addresses from the shared network.

Because Deployment 2 310 is fenced, fenced network 312 with exclusive access only to the VMs in Deployment 2 is created. VMs A2 and B2 in Deployment 2 310 have the addresses defined in the configuration, but these addresses are only used within fenced network 312. Virtual router 314 connects fenced network 312 with shared network Blue 316. In one embodiment, fenced network 312 is implemented as a group of ports on a VSwitch that does not have external connectivity. Each of the "fenced" VMs A2 and B2 gets assigned an external IP address from Blue network 316, 192.168.0.3 and 192.168.0.4, respectively. Virtual router 314 performs address translation for packets travelling in or out of Deployment 2 310, thus translating 192.168.0.1 with 192.168.03 for VM A2, and 192.168.0.2 with 192.168.0.4 for VM B2.

FIGS. 4A-E illustrate the different uses of configurations with multi-networked VMs, according to one embodiment. FIG. 4A shows a configuration with two VMs and two networks. One of the networks is isolated and carries traffic between the two VMs, while the other network is a heartbeat network connected to a shared network. The heartbeat network is used to periodically test the status of the two VMs by using "heartbeat" network requests. FIG. 4B shows a VM with two VNICs connected to the same network. One of the VNICs is used as a failover VNIC for redundancy and high availability.

FIG. 4C shows another configuration with two CLNs. One CLN is used as a backup network for storing backup information in permanent storage. FIG. 4D shows a configuration for firewall testing. The two networks in the configuration are connected via VM 402 acting as a firewall. This allows a firewall tester to check the performance of firewall VM 402 when sending network traffic through the firewall. FIG. 4E shows a configuration with three VMs and two redundant networks that are used to balance the load across both networks.

Figure 5:
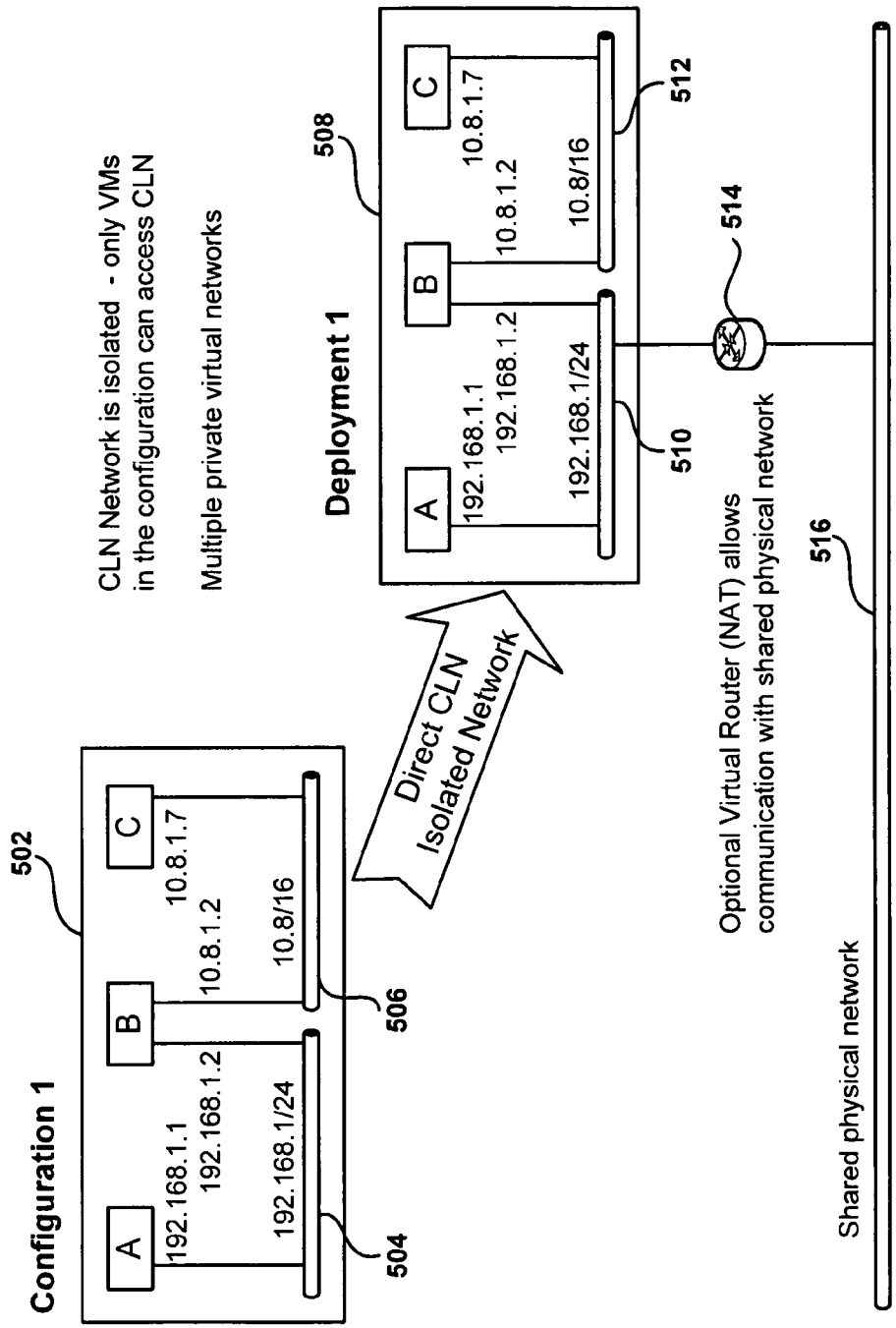
FIG. 5 illustrates the deployment of a configuration with Configuration Local Networks (CLN) in isolation mode in accordance with one or more embodiments.

FIG. 5 illustrates the deployment of a configuration with a CLN in isolation mode, in accordance with one embodiment of the invention. In virtual lab, a user can set up multiple CLNs for each configuration of virtual machines. Each CLN is an independent network segment from the external shared network and from other virtual lab networks. Only the VMs that belong to a configuration can connect directly to the CLN. The user can associate VMs VNICs with different virtual lab networks and virtual lab will configure these VNICs in the VMs. Virtual lab builds and deploys network routing tables in the VMs based on the parameters in the configuration. Configuration 502 includes VMs A-C, and networks 504 and 506 with network address 192.168.1/24 and 10.8/16, respectively. The deployment of configuration 502 results in deployed configuration 508, which has the same network parameters as configuration 502. The resulting deployed CLNs 510 and 510 are isolated from other CLNs in other configurations, even if other CLNs are derived from the same network template and have the same network address. Deployed CLNs 510 and 512 offer privacy to deployed VMs A-C because only configuration VMs may connect to deployed CLNs 510 and 512. If virtual lab detects that a foreign VM is connected to the CLN, a precautionary action is taken and the configuration's VMs are disconnected.

CLNs are local to the configuration and designed to provide isolation from physical networks. However, it can be very inconvenient that VMs do not have network connectivity outside the configuration. To avoid this problem, virtual lab provides functionality to connect a CLN to a shared network through a virtual router. This allows the CLN to be isolated while allowing the VMs connected to the CLN to have external connectivity. In the embodiment shown in FIG. 5, the user has selected that CLN 510 be connected to shared network 516. This is accomplished by deploying virtual router 514, which performs address translation for the VMs in deployed CLN 510. However, the network translation performed by virtual router 514 is different from a standard Network Address Translation (NAT) because virtual router 514 performs 1 to 1 address translation, as discussed below in more detail in reference to FIG. 6.

Figure 6:
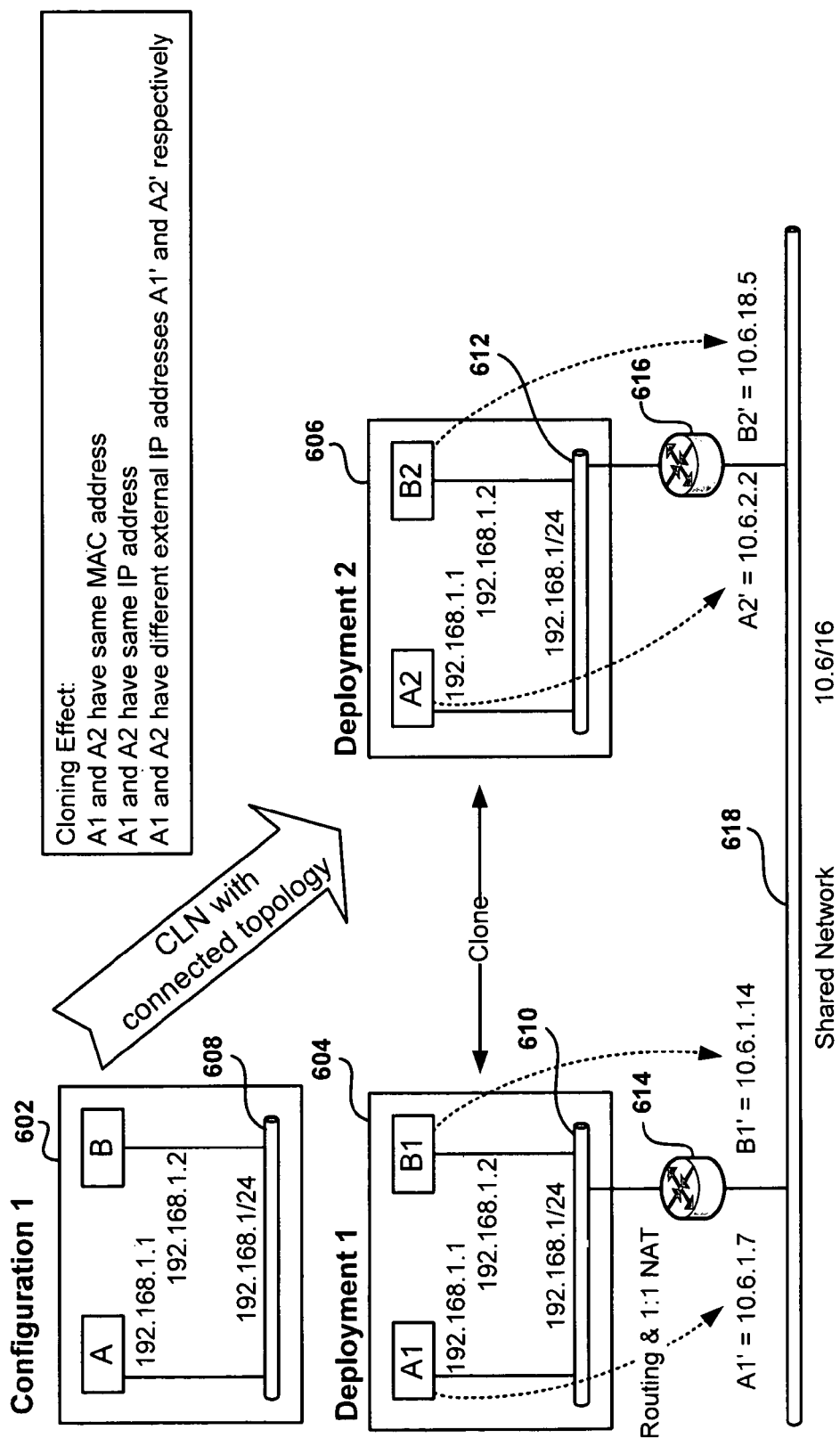
FIG. 6 illustrates the deployment of a CLN in a connected-topology mode in accordance with one or more embodiments.

FIG. 6 illustrates the deployment of a CLN in a connected-topology mode, in accordance with one embodiment of the invention. Configuration 1 602 has been deployed and cloned. The cloned configuration (not shown) has also been deployed. As a result, there are two deployments in the virtual infrastructure, Deployment 1 604 and Deployment 2 606, with identical settings. VMs A and B have been instantiated as VMs A1 and B1 in Deployment 1 604, and as VMs A2 and B2 in Deployment 606. In the same fashion, network 608 has been deployed as networks 610 and 612 in the respective configurations, with the same network address 192.068.1/24. The VMs in Deployment 1 604 are the same as VMs in Deployment 2 606 and they have the same network settings.

Networks 610 and 612 can co-exist in the virtual infrastructure with the same network addresses because networks 610 and 612 are isolated and private, as previously discussed. To provide external connectivity to the VMs, networks 610 and 612 with address 192.168.1/24 are connected to shared network 618 with address 10.6/16. This is because virtual lab allows the creations of CLNs that have their own network addressing scheme, independent of the addressing scheme of shared networks. To provide external connectivity to shared network 618, networks 610 and 612 are connected to virtual routers 614 and 616, respectively. The virtual routers 614 and 616 assign an IP address to each VM in the configuration from the shared network's pool of addresses, which are managed and administered by the virtual lab. The virtual routers 614 and 616 then perform one to one address translation for the network traffic between the corresponding CLN and the shared network. Thus, virtual router translates address 192.168.1.1 for VM A1 to the assigned address of A1' 10.6.1.7. On the other hand, virtual router 616 translates the same address 192.168.1.1 for VM A2 to external address A2' 10.6.2.2. Therefore, the VMs in the CLNs have their own associated external address in the shared network 618. The network pool of addresses is managed by the virtual lab in order to avoid associating the same IP address in the shared network to different deployed VMs.

Figure 7:
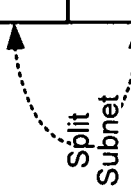
FIG. 7 includes a table used for managing Internet Protocol (IP) address pools and network overlays in accordance with one or more embodiments.

FIG. 7 includes a table used for managing IP address pools according to one embodiment. FIG. 7 includes a snapshot of the address reservation table in virtual lab. Four different networks have been defined in virtual lab: Test network α, Development network β, Corporate network γ, and Finance network ε. The Address column indicates the network IP address of each network, including the number of bits in the IP address reserved for the subnet address. The rightmost column indicates the address pools reserved for each of the networks. For example, Test network α has address 10.6/16 and virtual lab has reserved node address in the range 10.6.0.1 to 10.6.2.255. It should be noted that Development network β has the same network address 10.6/16 as Test network α but the IP address pool is different because Development network β has reserved a range of 10.6.1.51 to 10.6.1.200. As a result, Test network α and Development network β are split subnets because they have the same network address, but they have their own IP addresses for nodes in the respective network. Another table is kept by virtual lab to manage pools of MAC addresses in order to avoid assigning the same MAC address to different VMs.

When all instances of a VM are deleted, virtual lab releases the IP address to the IP pool. However, virtual lab proves expiration times for the assigned MAC and IP addresses to avoid stale Address Resolution Protocol (ARP) resolution. In order to avoid the reuse of IP addresses before the addresses may be purged from the ARP tables of VMs on the network, virtual lab will re-issue a MAC or IP address to a VM only after the address has been out of use for a certain amount of time. Virtual lab recycles an address for use by another deploying VM only after the expiration time of the previous use of the address. In another embodiment, virtual lab recycles network resources using a last-in-last-out (LILO) queue to reduce the chance of using a stale or conflicting resource.

Figure 8:
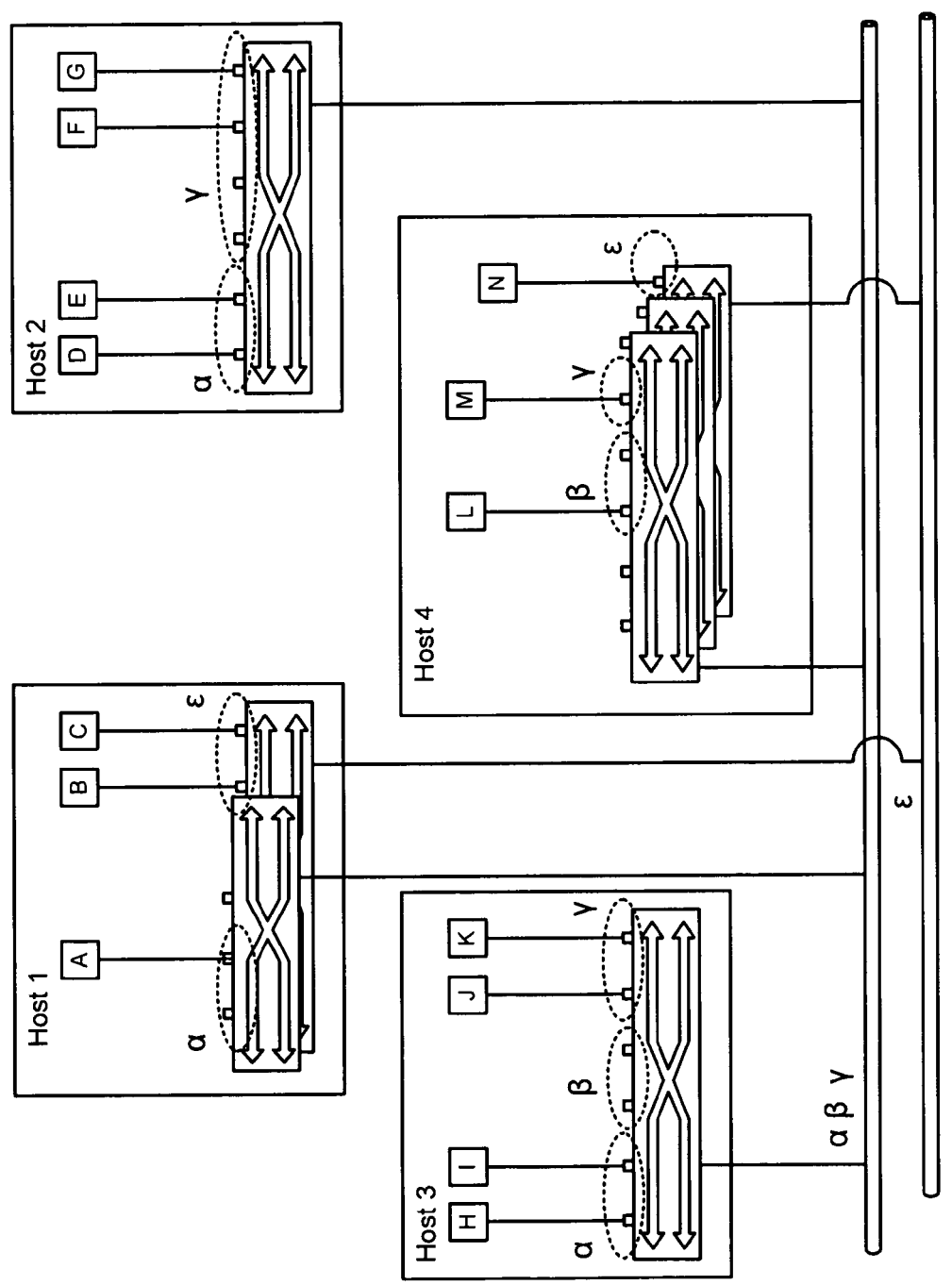
FIG. 8 illustrates an embodiment for deploying multiple virtual lab networks in the virtual infrastructure.

FIG. 8 illustrates an embodiment for deploying multiple virtual lab networks in the virtual infrastructure. The networks shown in FIG. 7 have been deployed in the virtual infrastructure and have been instantiated in Hosts 1-4. The hosts include VSwitches that assign different ports for different networks. For example, the VSwitch in Host 3 includes ports for networks α, β, and γ, which are different network overlays over the same actual physical network.

Figure 9:
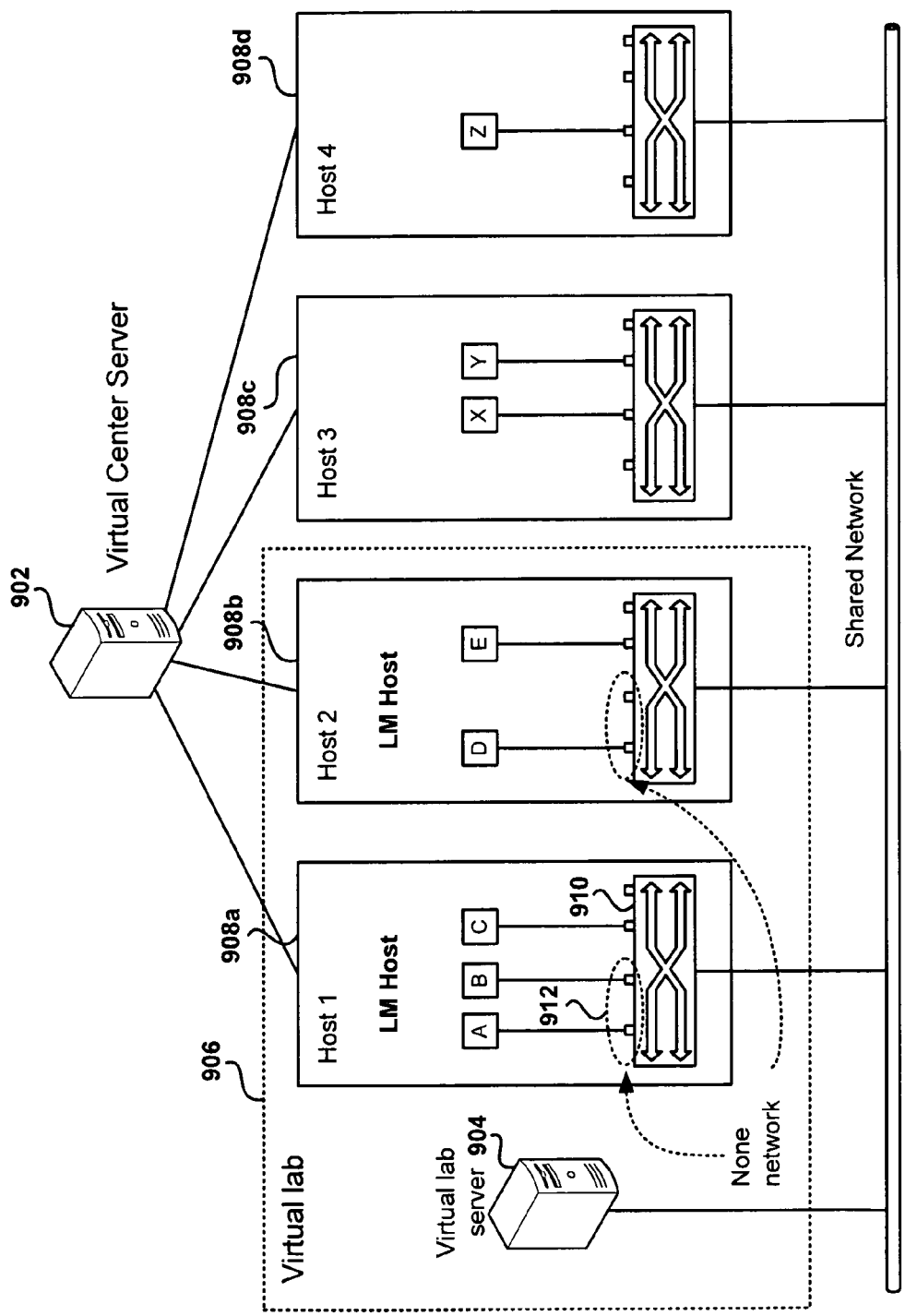
FIG. 9 illustrates the deployment of configurations in hosts associated with the virtual lab in accordance with one or more embodiments.

FIG. 9 illustrates the deployment of configurations in hosts associated with the virtual lab, according to one embodiment. In the embodiment shown in FIG. 9, virtual lab server 904 is managing hosts 908a and 908b within the virtual infrastructure managed by virtual center server 902. Virtual lab management area 906 defines the scope of control of virtual lab and includes virtual lab server 904 and hosts 908a-b.

Virtual lab deploys, in the hosts controlled by virtual lab, a network named the "none network" so named because there is a group of ports in the VSwitch for the none network, but this group of ports are not configured to connect to an actual network. When deploying a configuration, the VMs are attached to the none network in the case of a CLN, or to a managed shared network in the case of shared networks. This guarantees that the VMs are instantiated in one of the hosts managed by virtual lab because the none network is only instantiated in the hosts managed by virtual lab. Further, the VMs connected to the none network cannot migrate to a virtual infrastructure host not associated with the virtual lab server because the none network is not implemented in other hosts. In the embodiment shown in FIG. 9, the none network is implanted in VSwitch 910 in Host 1. Ports 912 are reserved for the none network by VSwitch 910.

Additionally, the none network can ease the work a user must do to deploy a configuration. Templates or VMs that do not have access to a network, either because of inadequate access rights or because of the lack of an appropriate network to select at the time of creation, may connect to the none network. The user can later on add connectivity to another virtual lab network. Further, the none network can be used by the user as a default network for VMs and avoid having to configure a network in some cases.

Figure 10:
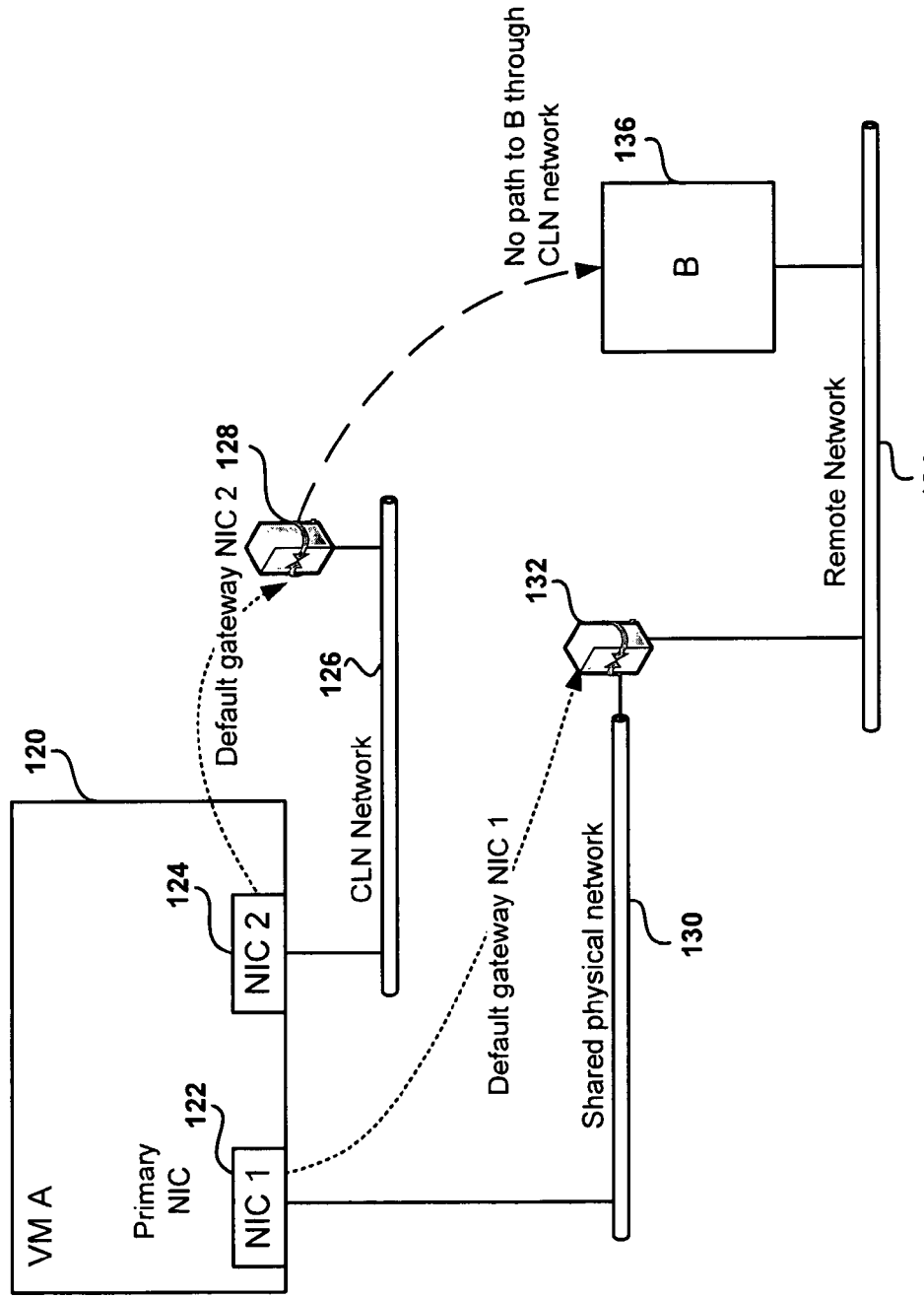
FIG. 10 illustrates setting a primary NIC in accordance with one or more embodiments.

FIG. 10 illustrates the concept of setting a primary NIC, according to one embodiment. When a VM includes several network connections, the user can specify which network is connected to the default gateway for the VM. This functionality is referred to as the primary NIC setting, because the VM identifies one NIC as the "primary" NIC, and the default gateway for the primary NIC becomes the default gateway for the VM. This is particularly useful when a VM is connected to a CLN and to a shared network. In this scenario, the VM "does not know" that one network is a CLN and that the CLN is isolated and private to the configuration. If the VM uses normal network routing, the VM may end up sending packets through the CLN to an external node, which is unreachable through the CLN. For example, VM 120 includes NIC 1 122 connected to shared network 130 and NIC 2 124 connected to CLN 126. VMs is sending a packet to external VM 136 and if VM 120 selects gateway 128 in network 126, the packet will never reach VM 136 because gateway 128 has no way of sending the packet to VM 136 (unless of course, gateway 128 decides to forward the packet back to VM 120 resulting in the packet flowing back and forth between VM 120 and gateway 128 until the packet is discarded or until an adaptive algorithm causes VM 136 to change its routing to a different gateway).

VM 120 does have a path to VM 136 via gateway 132 in network 130. Configuring VM 120 with NIC 1 122 as the primary NIC causes packets sent to remote networks to be sent through a gateway in the network connected to the primary NIC. Configuring the primary NIC in virtual lab allows the user to specify where to get the default gateway and Domain Name System (DNS) information. The user specifies the primary NIC and the gateway and DNS servers set on that network are used as the default for the VM. When configuring network settings in the VM, a single default route to the gateway chosen is added in the routing tables of the VM.

Figure 11:
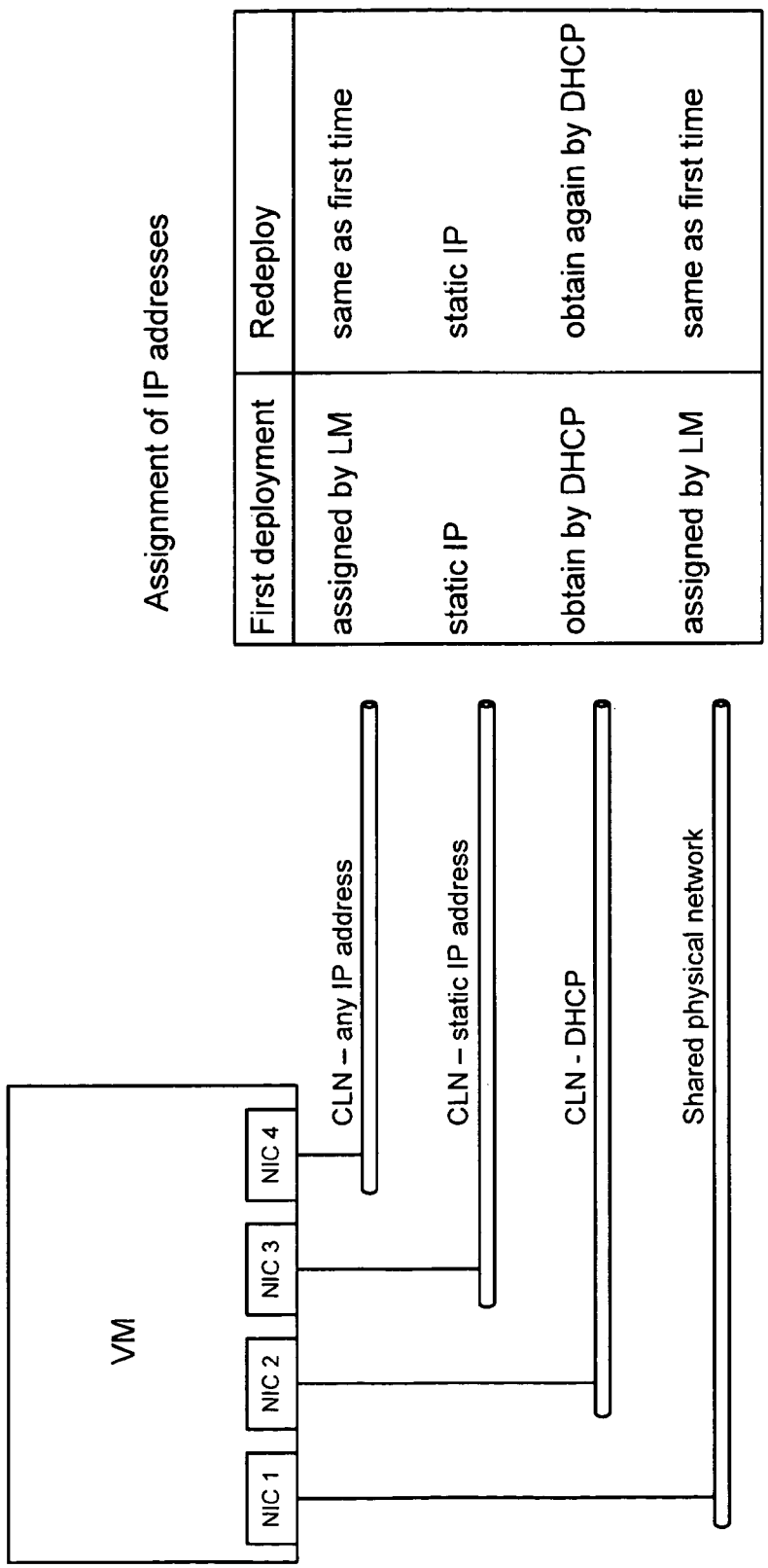
FIG. 11 illustrates different ways to assign IP addresses during deployment in accordance with one or more embodiments.

FIG. 11 illustrates different ways to assign IP addresses during deployment in accordance with one embodiment. There are three types of IP addressing modes: static-virtual lab managed, static-user managed and DHCP. In the static-virtual lab managed mode, virtual lab assigns the static IP addresses to the VMs. In the static-user managed mode, the user assigns the static IP address, and in the DHCP mode the standard DCHP protocol is used when the network is initialized in the VM. The VM shown in FIG. 11 has 4 NICs with different IP address assignment modes. When a VM is first deployed, NICs get configured according to the specifications of the VM in the configuration. If the VM is un-deployed and then re-deployed again, virtual lab assigns network addresses to the VM according to the network specification for each of the NICs. If a NIC is configured as getting "any" IP address, virtual lab assigns an IP address to the VNIC the first time is deployed, and when the VM is redeployed, virtual lab assigns the same network address to the VM.

Further, when a NIC is configured with a static IP, virtual lab configures that static IP the first time the VM is deployed and also during subsequent deployments. That is, the VM will always use the configured static IP address. When the NIC is configured to use Dynamic Host Configuration Protocol (DHCP), the NIC will use DCHP during all deployments, which may result in the same or in a different IP address each time the VM is deployed.

FIG. 12 shows an embodiment of a user interface for configuring virtual lab shared networks, also known as physical networks. In one or more embodiments, virtual lab administrators have to bind the virtual lab shared networks to an existing physical network in the virtual infrastructure. This task includes the configuration of the virtual switches in the hosts, as previously discussed in reference to FIG. 8. The administrator configures the virtual lab networks on the managed hosts by selecting appropriate virtual switches in the hosts to instantiate the shared networks. When creating a shared network in a host, the host must be actually physically connected to the real lab network via a physical network interface of the host. Virtual lab facilitates the task for the administrator by providing network hints to the administrator while configuring physical network bindings. The hints may include color hints for the different networks as well as a list of the subnets seen on the network. Virtual lab presents the information in one display to enable the administrator to make good choices with the virtual switch selections.

The screen capture shown in FIG. 12 shows a list of the hosts managed by virtual lab. For each host, a pull down menu allows the user to select a virtual switch to bind the virtual lab shared network. The pull down menu lists the host's virtual switches that are connected to real lab networks.

Figure 13:
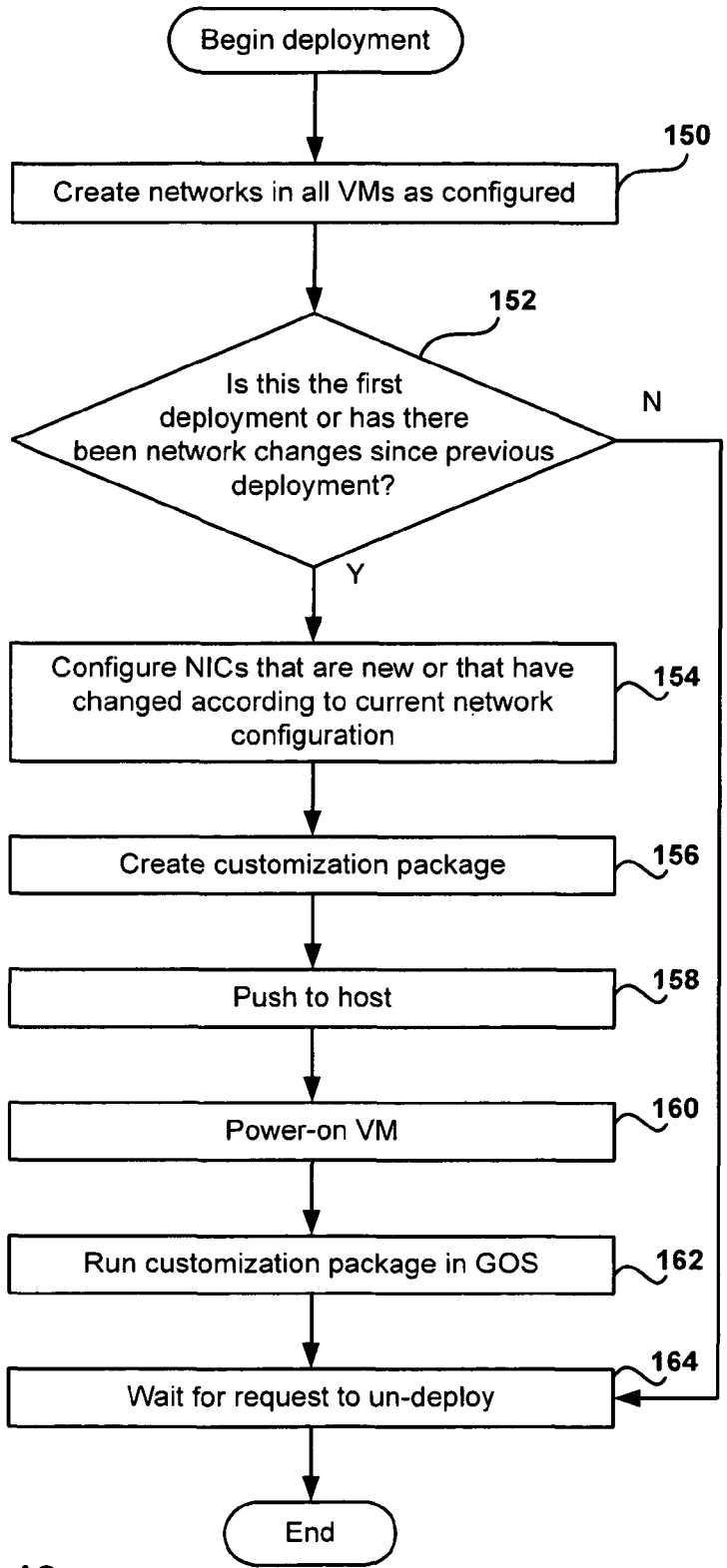
FIG. 13 illustrates a method for configuring network settings in a VM in accordance with one or more embodiments.

FIG. 13 illustrates a method for configuring network settings in a VM, according to one embodiment. In operation 150, the networks in the VMs are created as per the configuration specification. In operation 152, a check is performed to determine if this is the first deployment, or if this is not the first deployment, to determine if there has been network configuration changes since the previous deployment. This last condition may take place when a configuration is deployed, un-deployed, and then a user changes the network settings of the VM before re-deploying the configuration.

If the result of the check performed in operation 152 is negative then the method flows back to operation 164, and to operation 154 otherwise. During operation 154, the NICs that are new or that have changed are configured according to the current network configuration settings. After operation 154, a customization packet is created by virtual lab in operation 156. In one embodiment, the customization packet is a script to be executed by a guest operating system in each VM to configure the VNICs in the VM. The customization packet is pushed to the host in operation 158 and then the VM is powered-on in the virtual infrastructure in operation 160. Once the VM is powered-on, the virtual infrastructure runs the customization packet in the GOS of the VM during operation 162. In operation 164, the system waits for a request to un-deploy the configuration before ending the process.

Figure 14:
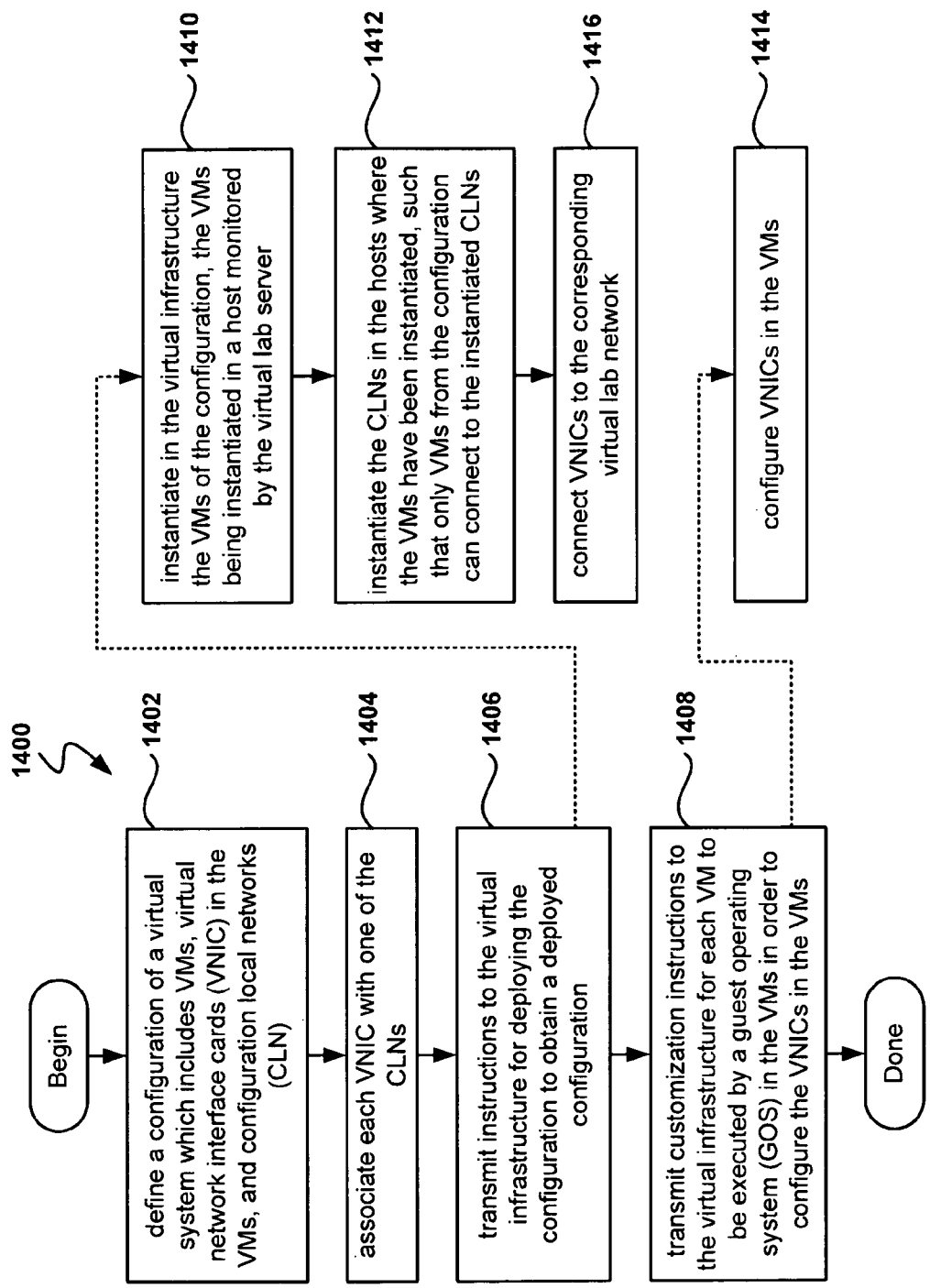
FIG. 14 shows the process flow for creating isolated environments that include VMs and networks in accordance with one or more embodiments.

FIG. 14 shows process flow 1400 for creating isolated environments that include virtual machines (VM) and networks, according to one embodiment of the invention. In operation 1402, the method defines a configuration of a virtual system. The configuration includes VMs, virtual VNICs in the VMs, and CLNs. After operation 1402, each VNIC is associated with one of the CLNs in operation 1404. See for example FIGS. 2A-B, 8, 9, and 12. Further, in operation 1406, instructions are transmitted to the virtual infrastructure for deploying the configuration to obtain a deployed configuration, and in operation 1408, customization instructions are transmitted to the virtual infrastructure for each VM. In one embodiment, application module 1204 of FIG. 2C transmits the instructions to the virtual infrastructure server.

Once the virtual infrastructure receives the instructions sent in operation 1406, the virtual infrastructure performs operations 1410, 1412, and 1414. In operation 1410, the VMs of the configuration are instantiated in the virtual infrastructure. The VMs are instantiated in hosts monitored by a virtual lab server. In one embodiment, virtual lab uses the "none" network to make the VMs be instantiated in the hosts managed by virtual lab, as previously discussed in reference to FIG. 9. In operation 1412, the virtual infrastructure instantiates the CLNs in the hosts where the VMs have been instantiated, such that only VMs from the configuration can connect to the instantiated CLNs. In operation 1412, virtual routers can also be created if required by the network configuration. In operation 1416 the VNICs are connected to the corresponding virtual lab network. In addition, the customization instructions transmitted in operation 1408 are executed by the GOS in each VM to configure the VM VNICs.

Figure 15:
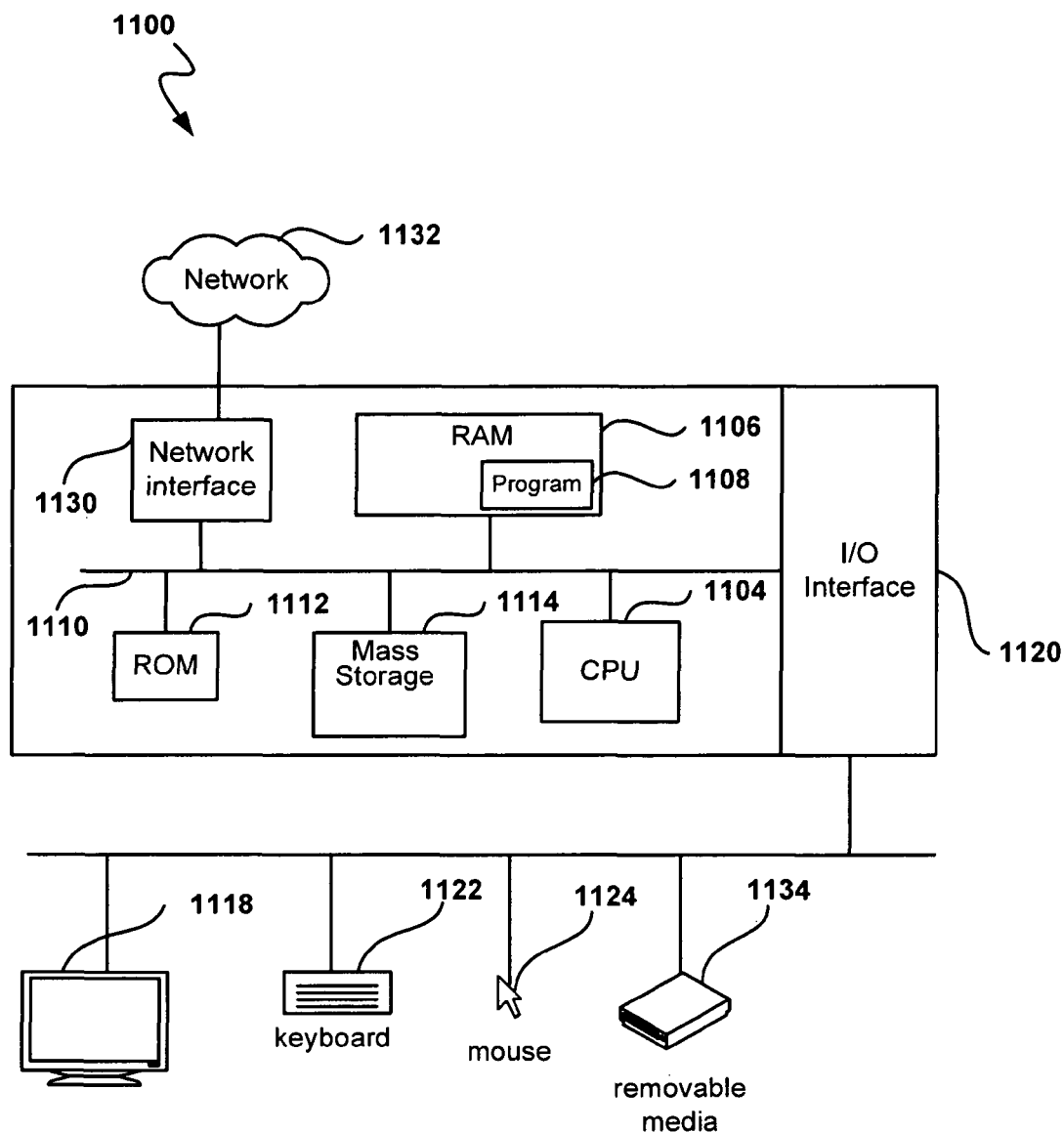
FIG. 15 is a simplified schematic diagram of a computer system for implementing embodiments of the present invention.

FIG. 15 is a simplified schematic diagram of a computer system for implementing embodiments of the present invention. It should be appreciated that embodiments of the invention described herein may be performed with a digital processing system, such as a conventional, general-purpose computer system. Special purpose computers, which are designed or programmed to perform only one function may be used in the alternative. As shown in FIG. 13, the computer system includes a central processing unit 1104, which is coupled through bus 1110 to random access memory (RAM) 1106, read-only memory (ROM) 1112, and mass storage device 1114. Program 1108 resides in RAM 1106, but can also reside in mass storage 1114. Program 1108 can include a virtual machine, a virtual router, and other programs used to implement embodiments of the invention. Mass storage device 1114 represents a persistent data storage device such as a floppy disc drive or a fixed disc drive, which may be local or remote. Network interface 1130 provides connections via network 1132, allowing communications with other devices. It should be appreciated that Central Processing Unit (CPU) 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for creating isolated environments that include virtual machines (VM) and networks in a virtual infrastructure, the method comprising:
defining a configuration of a virtual system which includes a plurality of VMs, virtual network interface cards (VNIC) in the VMs, and configuration local networks (CLNs), wherein each CLN defines a network among the plurality of VMs to which only the plurality of VMs are connected;
associating each VNIC with one of the CLNs;
transmitting instructions to the virtual infrastructure for deploying the configuration to obtain a deployed configuration, the deploying including,
instantiating in the virtual infrastructure the VMs of the configuration, each VM being instantiated in a host monitored by a virtual lab server; and
instantiating the CLNs in the hosts where the VMs have been instantiated, wherein only VMs from the configuration can connect to the instantiated CLNs; and
transmitting customization instructions to the virtual infrastructure for each VM, the customization instructions being executed by a guest operating system (GOS) in the each VM to configure the VNICs in the VM.

2. The method as recited in claim 1, further including:
connecting one of the CLNs to a shared network via a virtual router to provide connectivity to networks external to the deployed configuration.

3. The method as recited in claim 2, wherein the virtual router performs network address translations between the connected CLN and the shared network, wherein each VNIC with a network address from the connected CLN gets assigned a different network address in the shared network.

4. The method as recited in claim 2, wherein the connected CLN and the shared network have separate layer 2 and layer 3 addressing, wherein the virtual router is implemented as a VM with a VNIC connected to the connected CLN and a VNIC connected to the shared network.

5. The method as recited in claim 1, further including:
capturing the deployed configuration;
archiving in storage the captured deployed configuration;
retrieving from storage the captured deployed configuration; and
redeploying the retrieved captured deployed configuration.

6. The method as recited in claim 1, further including:
detecting an external VM not belonging to the deployed configuration connected to one of the CLNs; and
disconnecting the VMs in the deployed configuration from the CLNs when the external VM is detected.

7. The method as recited in claim 1, further including:
deploying a second configuration to obtain a second deployment, wherein the deployed configuration and the second configuration have a CLN with a same network address;
reserving a pool of network addresses for each of the CLNs in the deployed configurations with the same network address.

8. The method as recited in claim 1, wherein the deployed configuration further includes a shared network with external connectivity, wherein defining the configuration further includes designating a VNIC as a primary NIC, the VNIC being in a VM connected to the shared network and to one or more CLNs.

9. The method as recited in claim 8, wherein the network connected to the primary NIC is used to provide default gateway and network settings.

10. A system for creating isolated environments that include virtual machines (VM) and networks in a virtual infrastructure, the system comprising:
a database for storing configurations of virtual systems and virtual lab networks created, wherein each configuration defines a plurality of VMs, virtual lab networks, virtual network interface cards (VNIC) in the VMs, and connections from the plurality of VMs to the virtual lab networks, and at least one of the virtual lab networks is a CLN, the CLN being a network of at least some of the plurality of VMs to which only said at least some of the plurality of VMs are connected; and
a computer having stored thereon executable program instructions, which when executed, cause the computer to transmit instructions to the virtual infrastructure to deploy the configuration resulting in a deployed configuration, the deployment including,
instantiating in the virtual infrastructure the VMs of the configuration, each VM being instantiated in a host monitored by a virtual lab server;
instantiating the virtual lab networks in the hosts where the VMs have been instantiated; and
performing customization instructions at each VM, the customization instructions being executed by a guest operating system (GOS) in the each VM to configure the VNICs in the VM.

11. The system of claim 10, wherein each virtual lab network is one of a CLN or a shared network, wherein only VMs from the deployed configuration can connect to the instantiated CLNs, wherein the CLN is isolated within the deployed configuration, wherein the shared network is available to VMs outside the deployed configuration.

12. The system of claim 11, wherein the virtual infrastructure has deployed a plurality of additional configurations, wherein two or more shared networks have been instantiated by the plurality of additional configurations, the two or more shared networks coexisting over a same physical network.

13. The system of claim 10, wherein the application module, tracks network addresses assigned in the deployed configurations, and manages the instantiating of VMs and virtual lab networks in order to avoid network conflicts when performing the customization instructions at the VMs.

14. The system of claim 10, wherein the shared network is part of a Virtual Local Area Network (VLAN).

15. The system of claim 10, wherein a none network is initially created for each VM during the deployment, the none network being available in virtual infrastructure hosts associated with the virtual lab server.

16. The system of claim 15, wherein the VMs connected to the none network cannot migrate to a virtual infrastructure host not associated with the virtual lab server.

17. The system of claim 15, wherein the none network is used as a default network for VMs without any network configured.

18. The system of claim 10, wherein the VMs in the deployed configuration are bound to virtual infrastructure hosts associated with a virtual lab server.

19. The system of claim 10, further including:
a user interface module for interaction with a user, wherein the application module collects information on the virtual switches and hosts where the virtual switches are located; wherein the user interface provides network hints to an administrator by presenting the collected information in order to connect the shared networks to a physical network.

20. A computer program embedded in a non-transitory computer-readable storage medium, when executed by one or more processors, for creating isolated environments that include virtual machines (VM) and networks in a virtual infrastructure, the computer program comprising:
program instructions for defining a configuration of a virtual system which includes a plurality of VMs, virtual network interface cards (VNIC) in the VMs, and configuration local networks (CLNs), each CLN defining a network among the plurality of VMs to which only the plurality of VMs are connected;
program instructions for associating each VNIC with one of the CLNs;
program instructions for transmitting instructions to the virtual infrastructure for deploying the configuration to obtain a deployed configuration, the deploying including,
instantiating in the virtual infrastructure the VMs of the configuration, each VM being instantiated in a host monitored by a virtual lab server; and
instantiating the CLNs in the hosts where the VMs have been instantiated, wherein only VMs from the configuration can connect to the instantiated CLNs; and
program instructions for transmitting customization instructions to the virtual infrastructure for each VM, the customization instructions being executed by a guest operating system (GOS) in the each VM to configure the VNICs in the VM.

21. The computer program as recited in claim 20, further including: program instructions for reserving network addresses for the VNICs in the deployed configuration.

22. The computer program as recited in claim 20, further including:
program instructions for saving the reserved network addresses of the VMs in the deployed configuration;
program instructions for undeploying the deployed configuration; and
program instructions for redeploying the configuration a second time using the saved reserved network addresses.

23. The computer program as recited in claim 22, further including:
program instructions for detecting if network specifications of the configuration were changed before the redeploying; and
program instructions for reconfiguring NICs affected by the changes to the network specifications of the configuration when the change is detected.

24. The computer program as recited in claim 22, further including:
program instructions for recycling the saved network addresses when the configuration is erased, wherein the recycled network addresses are not re-used until a predetermined period of time ends.

* * * * *